May 13, 1952      A. R. NARRIN      2,596,588
COMPRESSIBLE CLUTCH PLATE
Filed May 15, 1947      2 SHEETS—SHEET 1
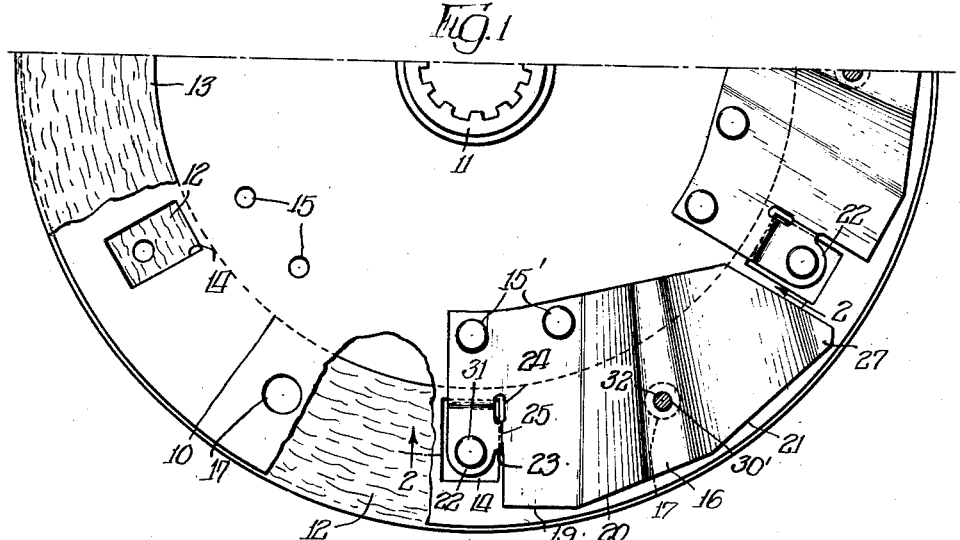
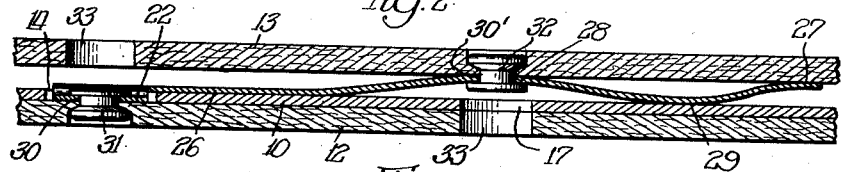
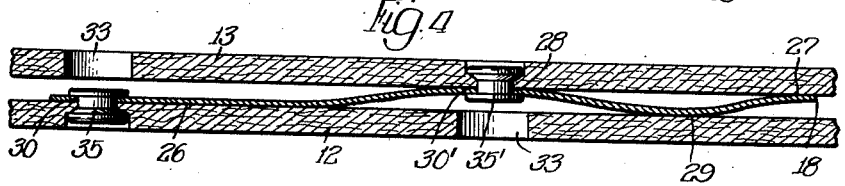
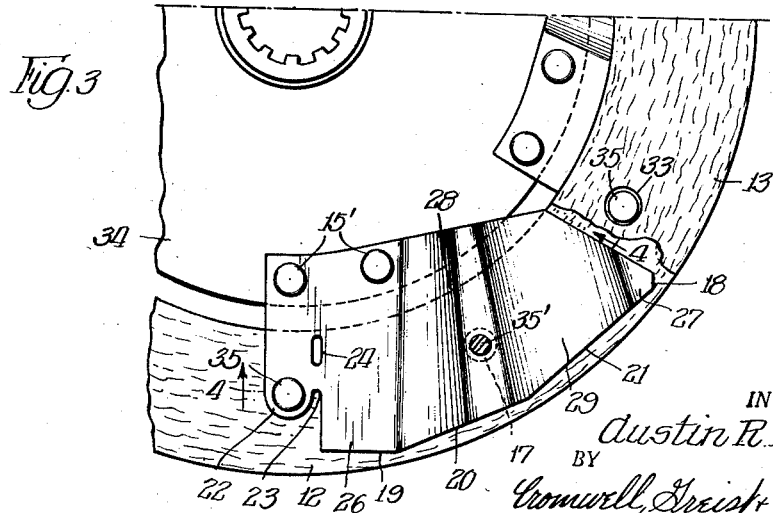
INVENTOR.
Austin R. Narrin,
BY
Cromwell, Greist + Warden
Attys

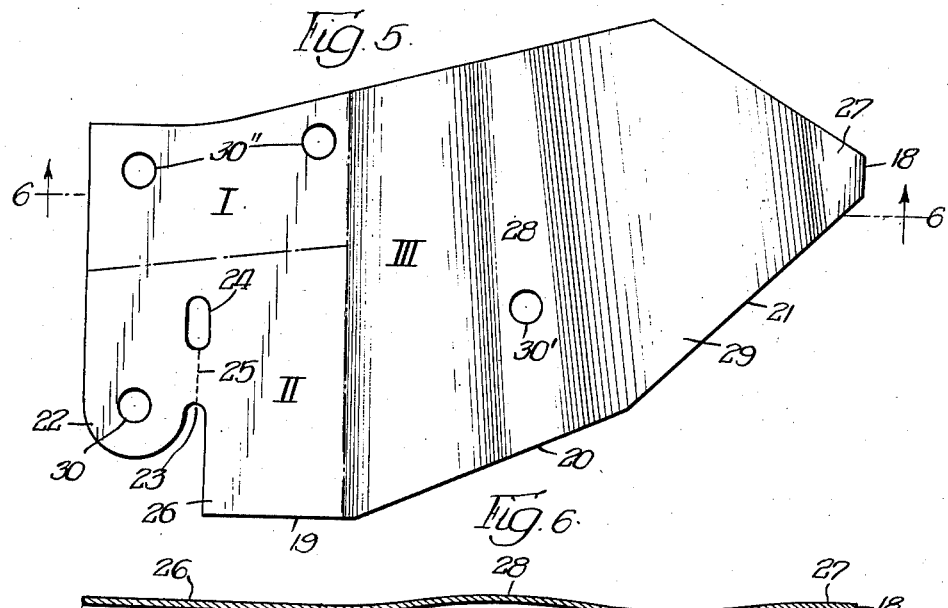
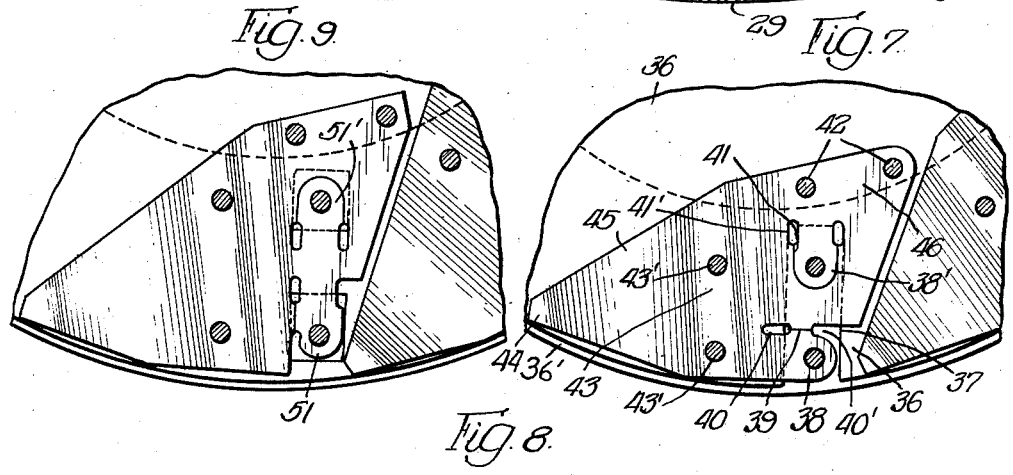
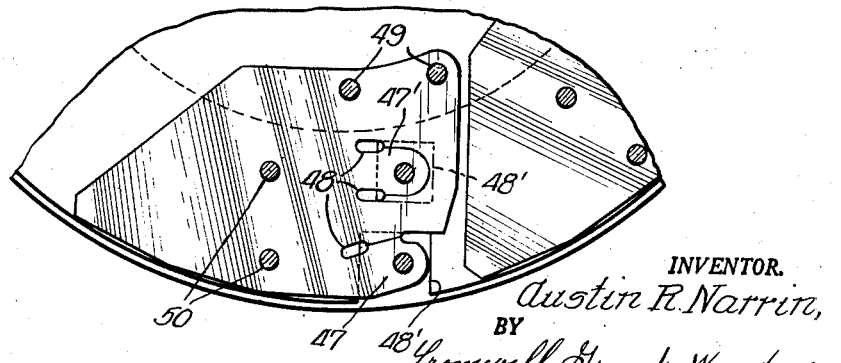

Patented May 13, 1952

2,596,588

UNITED STATES PATENT OFFICE 2,596,588

COMPRESSIBLE CLUTCH PLATE

Austin R. Narrin, Lake Orion, Mich., assignor to B. G. Quirk, Birmingham, Mich.

Application May 15, 1947, Serial No. 748,170

8 Claims. (Cl. 192—107)

This invention pertains generally to clutch driven plates for automotive disk clutches, and more particularly to a composite disk, cushion spring and facing assembly available in several optional relationships of disk and spring for association with standard types of facing.

It is a primary object of the invention to enable the selective fabrication at relatively little cost and inconvenience of a large number of different clutch driven plate units each faced with any one of a large number of types of standard facings, which units are capable of being installed in the clutch assembly of any one of numerous types of automotive power transmissions, in accordance with the requisite axial thickness thereof, the outer and inner plate diameters, the facing rivet spacing, and other factors characterizing the assembly involved.

Another object is to provide a clutch disk and cushion spring assembly adapted to be faced with any one of a large number of standard facings of standard but variable thickness, diameter and rivet drilling pattern in which the outline and drilling pattern of the cushion spring are such as to enable its association with a selected one of several standard disks of different types to result in a faced clutch driven plate of the requisite overall free and compressed thickness, inner and outer diameter, etc., all as dictated by the particular automotive installation for which the plate is intended.

A still further object is to provide an association of cushion spring and clutch disk of the type described, in which the spring and disk are specially coordinated with one another as regards the thickness and diameter of the disk, and are specially adapted for association with any one of a number of standard frictional clutch facings as regards the matters of thickness, diameter and rivet drilling pattern.

More specifically, it is an object of the invention to provide a disk and cushion assembly including a spring supporting disk of selected gauge and larger or smaller diameter, in accordance with the desired final thickness of the complete clutch plate, and in which certain individual cushion members or springs attached to the disk have provision for securing the same directly to a standard friction clutch facing, in the event a disk of a relatively small diameter is employed, or to said facing through openings in the intervening disk, in case the latter is of a larger diameter; whereby, by utilizing a relatively small number of optional types of disks and a properly selected and coordinated design taken from several different designs of cushion members, it is possible to provide a very large number of diameters and thicknesses of plate assembly in which facings of different standard thicknesses and rivet drilling patterns may be employed, thereby satisfying the clutch driven plate specifications of practically all models of many different automotive manufacturers.

Another object is to provide various embodiments of a clutch cushion spring each of which has pre-formed rivet receiving holes permitting assembly thereof with any one of a given group of standard clutch facings having a common standard rivet drilling pattern, thereby eliminating the need to manufacture and maintain a large number of different sizes and designs of spring in order to meet the varying requirements of clutch plates as to diameter and free and compressed thickness.

Yet another object is to provide a clutch spring adapted for optional association either as a part of a large disk type clutch plate or of a small disk type, in which, when assembled with a properly selected central clutch disk and friction facings, the outer and inner diameters as well as the free and the compressed axial thickness of the plate assembly may be made practically identical to the corresponding dimensions of any known design of driven plate assembly.

Further and more specific objects and advantages will be apparent to those skilled in the art upon a full understanding of the novel structure. Several embodiments of the invention are presented herein by way of illustration, but it will be appreciated that the invention is susceptible of incorporation in still other structurally modified forms coming equally within the scope of the appended claims.

In the drawings,

Fig. 1 is a fragmentary view in front elevation, partially broken away, illustrating a cushion spring and clutch disk unit in accordance with this invention as operatively associated with certain friction facings in making up a complete clutch driven plate assembly, which is structurally like that known commonly as the large disk type plate;

Fig. 2 is an enlarged fragmentary view in section on a line corresponding generally to line 2—2 of Fig. 1, showing the spring and disk assembly with friction disks, portions of which disks are broken away in Fig. 1 for the sake of clarity;

Fig. 3 is a fragmentary view generally similar to Fig. 1, illustrating springs similar to those shown in Fig. 1 as applied to a disk of a different sort, and having associated therewith standard facings to constitute a clutch plate assembly of the above identified small disk type;

Fig. 4 is an enlarged fragmentary view similar to Fig. 2, being in section on a line generally corresponding to line 4—4 of Fig. 3;

Fig. 5 is a view, on an enlarged scale, further illustrating the configuration of the general type spring shown in Figs. 1 through 4;

Fig. 6 is a view in section on a line generally corresponding to line 6—6 of Fig. 5; and Figs. 7 through 9 are fragmentary views similar to Figs. 1 and 3, illustrating modified forms of springs incorporating the principles of the invention, adapted to be optionally used in association with selected supporting discs in the fabrication of driven clutch plate assemblies of either the large or small disk type.

In order to appreciate the theory on which the present invention is based, it should be understood that heretofore most driven plate replacement units have been sold with the friction facings attached. For one reason or another each of these units ordinarily has its own particular pattern of location of the rivets securing the facings thereto, which pattern, in general, does not conform to the standard pattern set up by the B. L. M. A. (Brake Lining Manufacturers Association). Accordingly, the replacement plate manufacturer is at times confronted with a sales handicap arising from the insistance of operators of clutch repair stations that they be supplied with clutch plate disks which can be refaced when necessary with a proper friction facing drilled in accordance with B. L. M. A. standards.

To better understand the situation, it should be appreciated that the maximum volume of clutch driven plate replacement sales lies in the group of automobiles from three to five years of age, and in many cases as old as seven or eight years. Over such a span the original equipment clutch manufacturers will have developed numerous types of driven plates most of which have some special pattern of facing rivet hole drilling. Accordingly, heretofore the clutch plate manufacturer, in order to meet replacement demands, must either supply a driven plate having a facing rivet hole drilling pattern of his own or must make a large investment in developing many clutch driven plates exactly identical with those driven plates which had been used in each specific automobile model.

A further alternative is to develop a certain group of facing drilling patterns which will correspond to at least one or more of the B. L. M. A. standards. However, this is rather difficult, inasmuch as the facings not only vary in O. D. and I. D., but also in thickness, as do also the disks of the driven plates. Furthermore, the shape of the cushion spring must also conform to the facing rivet pattern in order that the high and low points of the spring shall be in proper relation to the facing rivet pattern.

The present invention generally follows the alternative just described, but in a manner which greatly minimizes the expenditure to which the manufacturer is put in meeting replacement orders. The invention enables a wide variety of replacement clutch driven plates to be assembled from a comparatively limited number of disks of different thickness and diameter, together with a few different sorts of cushion springs having rivet hole drillings located in conformity with the attachment rivet holes in said disk and also other rivet holes for facing rivets, located in such manner as to permit the attachment thereto of at least one pair of facings of desired O. D., I. D. and thickness and having standard B. L. M. A. rivet hole drilling pattern. In accomplishing this result I provide a novel cushion spring or member which may be attached to the large type disk of any desired thickness to form a large disk type driven plate assembly or to a small type disk to form a small disk type assembly, the said spring being so designed as to its configuration and its facing rivet hole locations as to permit the attachment of a pair of friction facings having the desired O. D., I. D., thickness and a standard B. L. M. A. facing rivet hole drilling pattern, thus providing a clutch driven plate assembly of the desired type and having values for O. D. and I. D. of facing together with values of free and compressed thickness of assembly which closely approximate those desired.

Referring to Figs. 1 through 6, wherein I illustrate one optional adaptation of the invention, the reference numeral 10 designates the usual inner supporting disk of the clutch plate, the hub 11 of which is splined for a driving connection to a shaft. Annular clutch facings 12, 13 are adapted to be carried by the disk through the agency of the cushion spring, to be described.

As illustrated in Figs. 1 and 2, the disk 10 is of a diameter approximating the O. D. of facings 12, 13; hence, serves as a thickness-determining shim or filler whereby the desired free and compressed axial thickness of the final clutch plate may be determined in part. To this end, the disks 10 are intended to be furnished in several optional thicknesses. When built up with the cushion springs and facings, a large disk type clutch plate results. In other cases, the use of a central disk of smaller diameter than the I. D. of the facings may be prescribed, by reason of the thickness specified for the final installations, or for other reasons. In these instances a clutch plate of the small disk type is produced.

As shown in Figs. 1 and 2, at suitably spaced points about its periphery disk 10 has generally rectangular apertures 14 therein, for a purpose to be described, and in the general, radially inward direction from these apertures is provided with pairs of rivet receiving holes 15 through which rivets 15' are applied to secure the cushion springs to the disk 10. Apertures 14 are for the purpose of enabling the cushion springs, generally designated 16, to be riveted to a facing 12 on the side of disk 10 opposite the spring, namely, the flywheel side facing. Further holes 17 are afforded for the riveting of the cushion spring to the facing 13 which is on the side of the disk adjacent the spring. The arrangement of apertures 14 and holes 17 is in accordance with a standard B. L. M. A. facing rivet drilling pattern. The relative location of facing rivet holes shown in Figs. 1 through 6 will adapt the disk assembly to accommodate a common pattern of facing drilling.

The spring 16, as applied to the large disk 10 of the clutch plate shown in Figs. 1 and 2, has the outline and cross-sectional configuration illustrated in Figs. 5 and 6, which figures, for clarity of detail, represent the spring in twice its actual size. The spring is stamped from spring sheet metal, in an elongated, roughly parallel-sided polygonal outline, terminating at one end in a truncated angle 18. The outer edge of the spring is defined by marginal lines 19, 20 and 21 which correspond, when the spring is in operative position, to relatively short chords on the perimeter of disk 10 and follow the peripheral outline of disk 10 rather closely (see Fig. 1). At the end thereof opposite the truncated end 18 the spring blank is blanked out to provide a radially disposed formation in the shape of a tab-like tongue 22, which tongue is disposed inwardly of the outer margin 19 of the spring. Tongue 22 is defined in part by a re-entrant portion or bay 23 extending from the edge 19, and radially inwardly of this bay the spring blank has an elongated, punched-out opening 24 therein for the purpose of enabling the lateral sides of the tongue 22 to be completely freed from the remainder of the spring, when desired, by shearing along the line 25 between the bay and elongated opening 24. A long flexible tongue may therefore be produced, starting at the base of the opening 24, to adapt the spring for use in the compound type clutch plate, in the manner hereinafter described.

As illustrated in Figs. 5 and 6, the spring is flat in the generally rectangular area 26 and hence lies in surface contacting relation to disk 10, in that area of the spring member in which tongue 22 is located. The spring member 16 is also flat in the area adjacent the truncated angular end 18, as designated at 27. Between these flat, parallel extremities the material of the blank is shaped in an undulatory or waving sectional outline, as clearly illustrated in Fig. 6, in a manner to provide an intermediate, generally flat area or land 28 which is upwardly convex in the direction of the friction facing 13, and a further relatively flat area or land 29 which is coplanar with area 26 and, with the latter, contacts disk 10 or, in some installations, the flywheel side facing 12. As illustrated in Fig. 1, the surfaces 26 and 29 engage the supporting disk.

The lateral width of these flat portions is maintained as small as possible consistent with the presentation of radial bearing surfaces sufficient to withstand wear, thereby making the major area of the cushion member section other than area 26 available for a springing purpose.

The tongue 22 and spring surface 28 are provided with facing attaching rivet holes 30, 30', respectively located in correspondence with aperture 14 and hole 17; and the area 26 carries cushion attaching rivet holes 30" located and spaced similarly to disk holes 15. As described above, the cushion rivet holes 30, 30' will be arranged in conformity with the standard rivet drilling pattern of some certain class of facings, which are thereby enabled to be secured on plate assemblies of a variety of sizes by the selective use of one of a relatively restricted number of types of spring, in association with a selected type of disk 10.

It will be observed that the spring 16 is characterized in an over-all way by three functional portions or sections, namely (1) a flat circumferentially extending disk attaching section, indicated generally on Fig. 5 by the numeral I, which first section extends along the inner margin of the spring for a portion only of the length of the latter and is perforated at circumferentially spaced points 30"—30" and riveted through such perforations to the disk; (2) a second section, indicated by the numeral II, which second section is located directly outward of the disk attaching section I in underlying relation to the upper friction facing 13 and is perforated at 30 and riveted through such perforation to the upper facing, and (3) a relatively large terminal section, indicated by the numeral III, which third section spans both the end of the first section I and the end of the second section II, in generally endwise continuing relation to both the section I and the section II, and extends circumferentially therefrom in an undulation, and is perforated at 30' at the crest of the undulation and riveted through such perforation to the rear friction facing 12.

In adapting the above construction for a given replacement installation, it may be desired to build up selected springs, disks and facings in a large disk type clutch plate, as illustrated in Figs. 1 and 2. In this case the tongue 22 is severed from the remainder of the spring section by shearing on line 25. The spring is then attached to disk 10 by rivets 15' applied through holes 15 and 30" in the disk and spring respectively, and the spring tongue 22 is deflected downwardly through the rectangular disk aperture 14 and secured by a rivet 31 to the flywheel side facing 12. The spring is also secured to the other or pressure plate facing 13 by a rivet 32, the clearance opening 17 in the disk 10 making this assembly possible. Standard appropriate, preformed openings 33 in the facings provide access for heading over the rivets.

The requirements of another installation, as to thickness, for example, may dictate the selective building-up of disk, spring and facings in a small disk type clutch plate assembly, wherein the outer diameter of the disk, here denoted 34, is less than the inner diameter of facings 12, 13. Naturally, a different overall thickness may thus be produced. In this case the tongue 22 is left unsevered, as illustrated in Fig. 3, since severance is unnecessary, it being unnecessary to deflect the tongue out of the plane of the flat portion 26 of the spring, and since shearing would produce an objectionable burr at this point. The spring is secured to disk 34 by rivets 15' passing through the holes 15 in the disk 34, and to the respective facings 12, 13 by rivets 35, 35', in the manner shown in Fig. 4.

It is apparent that a large variety of clutch plate diameters and thicknesses may be reproduced by the selective assembly of one of a small number of different types of cushion springs, each of which is punched for facing attachment in accordance with one of a number of standard facing drilling patterns, of which that shown in Figs. 1 to 6 is illustrative.

In Fig. 7 I illustrate a modified embodiment of the spring having similar outline and wavy section, but adapted for use in combination with a large disk type plate assembly including a supporting disk 36 and facings 36' which have a different, but still standard, arrangement of rivet receiving holes corresponding to a standard facing drilling pattern.

In this instance the disk 36 has a radial slot 37 extending to its periphery to accommodate the tongues connecting the spring to the lower or flywheel side facing. The spring itself is adapted to have two bendable tongues 38, 38' formed therein, the former of which extends in a circumferential direction, being adapted to be freed for inward deflection by a slit 39 connecting an elongated hole 40 with a reentrant bay 40' adjoining the tongue. The second tongue is adapted to be punched out of the material of the spring blank, internally of the outline thereof, along a U-shaped tongue defining shear line 41 terminating at opposite ends in the elongated punched openings 41'. As in the first embodiment, the spring may be secured selectively to supporting disk 36 in accordance with the dimensional requirements of the installation. Depending on this factor, disk 36 may be of relatively large diameter and selected thickness, or of relatively small diameter for the small disk type plate. The rivets 42 passing through holes in both disk and cushion members constitute attaching means for retaining the cushion members in place. The convex, relatively flat surfaces 43, 44 have thrust engagement with one of the friction facings, being attached thereto by rivets at 43', and an intermediate flat surface 45 in the plane of a flat attaching portion 46 serves to engage either with disk 36 or with the other facing, depending on the diameter of disk involved. If a small disk type plate is employed, the tongues 38, 38' are left unsevered from the flat area 46, as in the previous form. Generally considered, the outline of the spring is of the same wavy or undulatory character as in the first embodiment, but the arrangement of rivet holes and attaching tongues is sufficiently different to accommodate a different class of standard facing drillings.

In Fig. 8 I illustrate a still further modified embodiment, similar to that of Fig. 7 in all substantial respects save the location of the tongues 47, 47' which are adapted to be deflected to secure the spring to a facing, when the diameter of the disk employed so requires.

As in Fig. 7, these tongues are defined by shearing the material between or up to a hole or holes 49 in the body of the spring. Suitable apertures or recesses 48' are provided in the disk to receive the tongues, as in the previous forms, and when the spring is employed in a small disk type assembly, the tongues are left unsevered from the remainder of the spring. This embodiment of the spring has rivet holes 49 for securement to the disk and a pair of rivet holes 50 in standard spacing for securement to the adjacent friction facing.

In Fig. 9 a still further modification is illustrated, quite similar to the form of Fig. 8, but in which the facing securing tongues 51, 51' are located to extend in opposite radial directions, being adapted to be defined by slot-like holes and sheared connection thereof in the same general manner as described above. Rivet receiving holes are provided in the spring, also in a generally similar manner to that previously described.

The foregoing embodiments of cushion spring are characterized in common by a flat attaching portion for securing the spring to the central disk with which it is built up, regardless of the sort of assembly in which the springs and disks are finally embodied, there being rivet holes in a standard spacing for this purpose. Provision may also be made in this flat portion for the production of bendable tongues, adapted to be partially severed from the remainder of the spring blank by pre-formed apertures to facilitate this severance, which severance is done only when the assembly of springs, disk and facing results in a large disk type clutch plate. In each case the spring portion of the construction extends to one side of the flat attaching portion in an undulatory fashion, providing flats or lands of relatively restricted lateral dimension, whereby a large share of the material of the spring is made available for springing purposes.

The cushion springs are exceedingly simple and, due to the large degree of standardization of the features thereof, can be blanked out and spring-conformed by a very few different dies. As a result, one of a relatively small number of spring designs, each individually standardized to a certain extent as regards a range of locations of rivet holes and/or rivet attaching tongues, will serve, in selected assembly with one of a very few diameters and thicknesses of central disk, to accommodate a very large number of standard clutch facings having variable but standard rivet drillings. Accordingly, the manufacturer need furnish and the seller or serviceman need stock but a small inventory of parts to enable a wide range of clutch plate dimensions to be duplicated.

The optionally available bendable tongues 22, 38, 38', 47, 47', 51 and 51' are left unsevered from the flat attaching portion of the respective cushion members until an assembly involving a large diameter supporting disk is required. At such time they are freed from the attaching portion whereby to be capable of deflection through the mating apertures in said disk and riveted to the subjacent facing. In this relation they firmly tie the facing to the disk. It may even be desirable to employ the tying tongues as torque sustaining elements in such an application by causing the same to engage the one or both sides of the mating apertures. Thus a portion of the torsional stress normally carried at the connection of the cushion to the disk 10 may be distributed to another area of the cushion.

I claim:

1. A clutch cushion spring of the type described comprising a sheet metal member having an attaching portion provided with rivet receiving holes adapting the same to be fixedly secured to a rotative support and an undulatory springing portion extending circumferentially from said attaching portion, said springing portion having an aperture therein for riveted securement of the member to one of a pair of clutch facings associated with said support, said attaching portion being marginally shaped to partially define an integral tying element, which tying element is provided with a hole therein for riveted securement thereof to the other of said facing elements, said tying element being further defined in part by a closed aperture of substantial size in said spring, which aperture is spaced from the rivet holes of said attaching portion and also spaced inwardly from one side of said tying element by the material of said spring, the material of the spring outwardly of said aperture and alongside said tying element being readily severable when it is desired to deflect said tying element relative to said attaching portion.

2. A clutch cushion spring as defined in claim 1 wherein there is an additional tying element located wholly within the marginal limits of said spring.

3. A clutch plate cushion spring comprising a sheet-like resilient metal member provided with an undulatory cushioning portion and an attaching portion adjoining said cushioning portion, said attaching portion being apertured adjacent its inner margin for the riveted securement thereof to a supporting disk, said member being provided with a further aperture located in outwardly spaced relation to said rivet aperturing and internally spaced from the outer margin of the member by the material of the member, said further aperture partially defining a tying tongue area which is adapted to be further separated from the remainder of said member along a line of severance extending from said outer margin into said further aperture, said tying tongue area being provided with a rivet hole located adjacent said outer margin and to one side of said line of severance.

4. A clutch plate cushion spring comprising a sheet-like resilient metal member provided with an undulatory cushioning portion and an attaching portion adjoining said cushioning portion, said attaching portion being apertured adjacent its inner margin for the riveted securement thereof to a supporting disk, said member being provided with a further aperture which is closed and is located in outwardly spaced relation to said rivet aperturing and internally spaced from the outer margin of the member by the material of the member, said outer margin being shaped to provide a re-entrant bay in alignment with said further aperture, said further aperture and bay partially defining a tying tongue area which is adapted to be further separated from the remainder of said member along a line of severance extending between said further aperture and bay, said tying tongue area being provided with a rivet hole located adjacent said outer margin and to one side of said line of severance.

5. In a clutch driven plate of the type characterized by a mounting disk and a pair of annular concentrically arranged friction facings, a plurality of generally pennant-shaped cushions of one-piece spring sheet metal construction arranged in annular array about the disk, each of said sections being elongated circumferentially of the disk, being relatively wide radially of the disk near one end of the cushion, and being of reduced width radially of the disk near the other end of the cushion; each of said cushions being provided for a portion only of its length along the inner margin of its wider end with a flat circumferentially extending disk-attaching section, which section is perforated at circumferentially spaced points and is riveted through said perforations to the disk; each of said cushions being further provided in its wider end at a point outwardly of said disk attaching section with a second section which underlies one of the aforesaid friction facings and is marginally indented adjacent the outer corner of the wider end of the cushion to provide a relatively small tab-like formation, which formation is perforated and is riveted through said perforation to the opposite friction facing; and each of said cushions being further provided in endwise continuing relation to both said first section and said second section with a relatively large undulated terminal section, which terminal section underlies said first mentioned friction facing and is perforated at the crest of an undulation and riveted through said perforation to that facing, said undulated terminal section at its point of connection with said first and second sections spanning both of said sections throughout the full radial extent of the latter, with the inner marginal edge of said terminal section connected directly with and extending without substantial deviation in the same general direction as the inner marginal edge of said first section.

6. A clutch driven plate cushion of one-piece spring sheet metal construction, adapted for use with a plurality of similar cushions arranged in annular array, in a clutch plate of the type having a pair of friction facings and a mounting disk to which the cushions are attached; said cushion being of generally rectangular over-all shape, being elongated in a direction which is generally circumferential of the plate when the cushion is applied in the position hereinafter described, being relatively wide near one of its ends, and being of somewhat reduced width at its other end; said cushion being provided for a portion only of its length along the inner margin of its wider end only with a narrow flat longitudinally extending section which when applied to the disk is adapted to project radially inward over the disk beyond the inner diameters of the facings and is perforated at longitudinally spaced points for the reception of disk attaching rivets; said cushion being further provided directly outward of said narrow longitudinally extending disk attaching section with a second section which is adapted to underlie one of the facings and is marginally indented adjacent the outer corner of the cushion to present a relatively small tab-like formation, which formation is perforated for riveted attachment to the opposite facing; and said cushion being further provided in generally end-wise continuing relation to both said first section and said second section with a relatively large undulated terminal section, which section is adapted to underlie the first mentioned facing and is perforated at the crest of undulation for riveted attachment to that facing.

7. An integral one-piece clutch driven plate cushion for installation in clutch assemblies of the type having a mounting disk and a pair of friction facings associated with the disk, said cushion being of generally rectangular circumferentially tapering shape and comprising a flat disk attaching portion and an undulatory spring portion extending circumferentially from said attaching portion, said attaching portion including an inner disk engaging area provided with rivet holes for attachment of the cushion to said disk and an area extending outwardly from said inner area and provided with a rivet hole for attachment to one of said facings, said cushion being marginally shaped adjacent said outer attaching area to define a bay extending inwardly of the cushion and located adjacent said last named rivet hole, said cushion being further provided with an elongated aperture in said outer attaching area which is located relatively close to the rivet hole in the latter in alignment with said inwardly extending bay, said aperture being spaced inwardly from the bay by the material of the cushion, said undulatory portion having a further rivet receiving hole for attachment to the other of said facings.

8. A clutch cushion comprising a flat attaching portion and an undulatory spring portion extending circumferentially from said attaching portion, said attaching portion including an inner disk engaging area provided with rivet holes for attachment of the cushion to a mounting disk and an area extending outwardly from said inner area and provided with a rivet hole for attachment to a friction facing, said cushion being marginally shaped adjacent said outer attaching portion area to define a bay extending inwardly of the cushion and located adjacent said last named rivet hole, which bay in part defines a marginal tying tongue in said outer attaching area, said cushion being further provided with an aperture in said outer attaching portion area which is located relatively close to the rivet hole in the latter and is spaced inwardly from the bay by the material of the cushion, said undulatory portion having a further rivet hole for attachment to another facing.

AUSTIN R. NARRIN.

REFERENCES CITED

The following references are of record in the file of this patent:

UNITED STATES PATENTS

| Number | Name | Date |
|---|---|---|
| 1,837,173 | Reed | Dec. 15, 1931 |
| 2,171,908 | Beringer | Sept. 5, 1939 |
| 2,195,666 | Wolfram | Apr. 2, 1940 |
| 2,256,712 | Hunt | Sept. 23, 1941 |
| 2,308,604 | Goodwin | Jan. 19, 1943 |